United States Patent
Knittl et al.

(10) Patent No.: US 10,416,879 B2
(45) Date of Patent: Sep. 17, 2019

(54) METHOD FOR OPERATING AN INFOTAINMENT SYSTEM OF A MOTOR VEHICLE, AND INFOTAINMENT SYSTEM FOR MOTOR VEHICLE

(71) Applicant: Audi AG, Ingolstadt (DE)

(72) Inventors: Thomas Knittl, Ingolstadt (DE); Vladimir Macoun, Ingolstadt (DE); Lorenz Bohrer, Munich (DE); Carolin Koeberle, Ingolstadt (DE)

(73) Assignee: Audi AG, Ingolstadt (DE)

( * ) Notice: Subject to any disclaimer, the term of this patent is extended or adjusted under 35 U.S.C. 154(b) by 219 days.

(21) Appl. No.: 15/523,565

(22) PCT Filed: Oct. 29, 2015

(86) PCT No.: PCT/EP2015/002146
§ 371 (c)(1),
(2) Date: Jul. 6, 2017

(87) PCT Pub. No.: WO2016/070975
PCT Pub. Date: May 12, 2016

(65) Prior Publication Data
US 2017/0308286 A1    Oct. 26, 2017

(30) Foreign Application Priority Data
Nov. 3, 2014  (DE) .......... 10 2014 016 326

(51) Int. Cl.
*G06F 3/00*     (2006.01)
*B60K 3/00*    (2006.01)
(Continued)

(52) U.S. Cl.
CPC .......... *G06F 3/04883* (2013.01); *B60K 35/00* (2013.01); *B60K 37/06* (2013.01);
(Continued)

(58) Field of Classification Search
CPC ...... G06F 3/04883; G06F 3/14; G06F 3/0488; H04M 1/6091; H04W 84/12
See application file for complete search history.

(56) References Cited

U.S. PATENT DOCUMENTS 8,271,033 B2  9/2012  Bunk et al.
9,575,771 B2  2/2017  Stolle et al.
(Continued)

FOREIGN PATENT DOCUMENTS

DE  102008014627 A1  9/2009
DE  102009059141 A1  4/2011
(Continued)

OTHER PUBLICATIONS

English-language abstract of German Patent Application Publication No. 10 2013 010 152 A1, published Dec. 24, 2013; 1 page.
(Continued)

*Primary Examiner* — Matthew Ell
*Assistant Examiner* — Zelalem W Shalu
(74) *Attorney, Agent, or Firm* — Sterne, Kessler, Goldstein & Fox P.L.L.C.

(57) ABSTRACT

A method for operating an infotainment system of a motor vehicle in which at least one data set stored on at least one mobile terminal is transmitted wirelessly to the infotainment system and received by the infotainment system as soon as a swipe gesture has been detected on the mobile terminal wherein the at least one data set is stored first in a buffer memory of the infotainment system and only then transmitted to a further memory of the infotainment system and then processed by means of the infotainment system when a predetermined confirmation action has been detected onboard. The invention also relates to an infotainment system for a motor vehicle.

12 Claims, 1 Drawing Sheet

(51) Int. Cl.
| | |
|---|---|
| *G06F 3/0488* | (2013.01) |
| *H04M 1/60* | (2006.01) |
| *B60K 35/00* | (2006.01) |
| *G06F 3/14* | (2006.01) |
| *H04L 29/08* | (2006.01) |
| *B60K 37/06* | (2006.01) |
| *H04W 4/80* | (2018.01) |
| *G06F 3/16* | (2006.01) |
| *H04W 84/12* | (2009.01) |

(52) U.S. Cl.
CPC .............. *G06F 3/0488* (2013.01); *G06F 3/14* (2013.01); *H04L 67/12* (2013.01); *H04M 1/6091* (2013.01); *B60K 2370/146* (2019.05); *B60K 2370/152* (2019.05); *B60K 2370/573* (2019.05); *B60K 2370/589* (2019.05); *G06F 3/167* (2013.01); *H04W 4/80* (2018.02); *H04W 84/12* (2013.01)

(56) References Cited

U.S. PATENT DOCUMENTS

| | | | | |
|---|---|---|---|---|
| 2007/0132773 | A1* | 6/2007 | Plante | G07C 5/0891 345/564 |
| 2009/0293068 | A1* | 11/2009 | Yagiu | G01C 21/26 719/318 |
| 2009/0309846 | A1 | 12/2009 | Trachtenberg et al. | |
| 2012/0299812 | A1 | 11/2012 | Park | |
| 2013/0030645 | A1* | 1/2013 | Divine | B60K 35/00 701/36 |
| 2014/0297674 | A1 | 10/2014 | Rhee et al. | |
| 2015/0163644 | A1* | 6/2015 | Soda | H04W 76/14 455/3.06 |

FOREIGN PATENT DOCUMENTS

| | | |
|---|---|---|
| DE | 102012009021 A1 | 11/2013 |
| DE | 102013010152 A1 | 12/2013 |
| DE | 102013000071 A1 | 7/2014 |
| DE | 102013201624 A1 | 7/2014 |
| EP | 2254034 A2 | 11/2010 |
| EP | 2793116 A2 | 10/2014 |
| WO | WO 2005/105509 A1 | 11/2005 |

OTHER PUBLICATIONS

English-language abstract of German Patent Application Publication No. 10 2013 201 624 A1, published Jul. 31, 2014; 1 page.
English-language abstract of German Patent Application Publication No. 10 2012 009 021 A1, published Nov. 7, 2013; 1 page.
English-language abstract of German Patent Application Publication No. 10 2013 000 071 A1, published Jul. 10, 2014; 2 pages.
English-language abstract of German Patent Application Publication No. 10 2008 014 627 A1, published Sep. 24, 2009; 1 page.
English-language abstract of International Publication No. WO 2005/105509 A1, published Nov. 10, 2005; 2 pages.
International Search Report and Written Opinion of the International Searching Authority directed to related International Patent Application No. PCT/EP2015/002146, dated Jan. 28, 2016, with attached English-language translation; 28 pages.
Written Opinion of the Authority in Charge of International Preliminary Examination directed to related International Patent Application No. PCT/EP2015/002146, dated Sep. 22, 2016, with attached English-language translation; 12 pages.
International Preliminary Report on Patentability directed to related International Patent Application No. PCT/EP2015/002146, dated Jan. 23, 2017, with attached English-language translation; 19 pages.

* cited by examiner

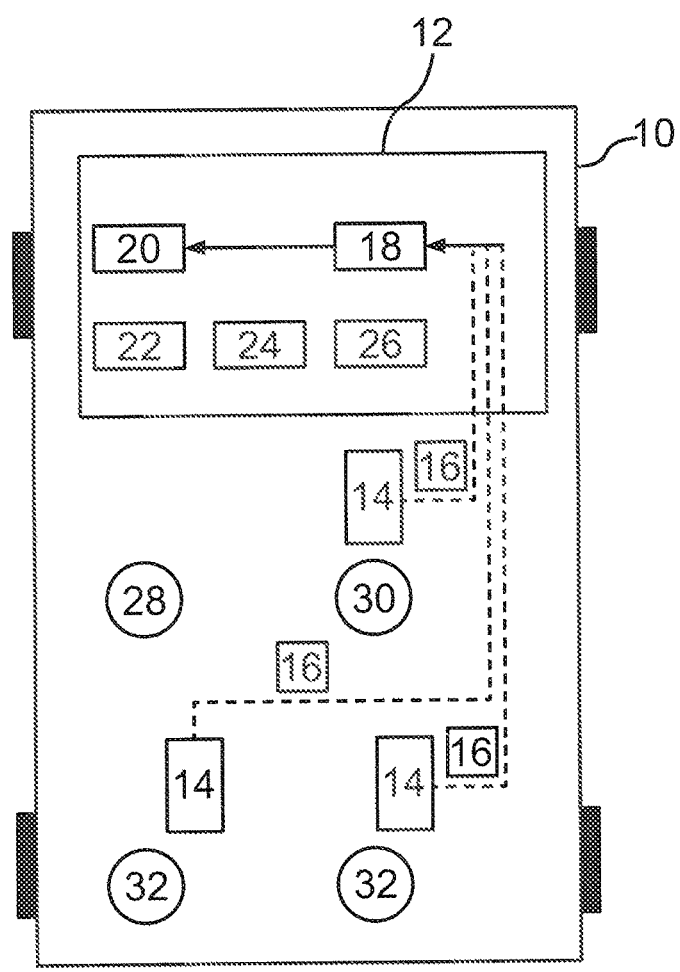

METHOD FOR OPERATING AN INFOTAINMENT SYSTEM OF A MOTOR VEHICLE, AND INFOTAINMENT SYSTEM FOR MOTOR VEHICLE

TECHNICAL FIELD

The invention relates to a method for operating an infotainment system of a motor vehicle and to an infotainment system for a motor vehicle of the type specified in the preamble of the independent claims.

BACKGROUND

DE 10 2013 010 152 A1 discloses a method for operating an infotainment system of a motor vehicle in which at least one data set of an infotainment system stored on at least one mobile terminal is wirelessly transmitted and received by the infotainment system as soon as a swipe gesture carried out on the mobile terminal has been detected. DE 10 2013 201 624 A1 and DE 10 2012 009 021 A1 likewise show such a method for operating an infotainment system of a motor vehicle.

BRIEF DESCRIPTION OF THE DRAWINGS/FIGURES

FIG. 1 shows a schematic representation of a motor vehicle which comprises an infotainment system which is designed to wirelessly receive and process data sets stored on different mobile terminals.

DETAILED DESCRIPTION

The object of the present invention is to provide an improved exchange of data sets between an infotainment system of a motor vehicle and at least one mobile terminal.

This object is achieved by a method for operating an infotainment system and by an infotainment system having the features of the independent claims. Advantageous embodiments comprising useful and non-trivial further developments of the invention are specified in the dependent claims.

In the method according to the invention for operating an infotainment system of a motor vehicle, at least one data set stored on at least one mobile terminal is transmitted wirelessly to the infotainment system and received by said infotainment system as soon as a swipe gesture has been detected on the mobile terminal. The method according to the invention is distinguished by the fact that the at least one data set is firstly stored in a buffer memory of the infotainment system and is then transmitted to a further memory of the infotainment system and then processed by means of the infotainment system when a predetermined confirmation action has been detected on-board.

In contrast to the methods known from the prior art, it is therefore necessary according to the invention that a certain predetermined confirmation action has been detected on-board so that the data set wirelessly transmitted by the mobile terminal is actually processed by the infotainment system. Thus, there is no automatic processing of the data set transmitted from the mobile terminal to the infotainment system carried out. As a result, the exchange of the data set and, in particular, the use of the data set, which is wirelessly exchanged between the mobile terminal and the infotainment system, can proceed in a particular orderly manner.

The mobile device can, for example, be a smart phone or a tablet computer which comprises a touch-sensitive display device. The mobile terminal and the infotainment system are connected wirelessly, for example, via WLAN, Bluetooth or via a so-called near-field communication (NFC). For example, as the at least one data set, a file can be stored in the buffer memory of the infotainment system and can only be transmitted to a further memory of the infotainment system and subsequently processed by means of the infotainment system if a predetermined confirmation action has been detected on-board. A file is to be understood as a stock of related data, which are firstly stored on the mobile terminal and are transmitted to the infotainment system as a function of the detected swipe gesture.

For example, these may be navigation files, music files, contact files for an address book or the like. A navigation file, for example, can be a preconfigured route predetermined by means of the mobile terminal, wherein the infotainment system can use this navigation file to operate a navigation device of the infotainment system, i.e., to take over the preconfigured route into the navigation system. The music files, for example, can be individual pieces of music or even entire music albums, which can be played back by an audio output device of the infotainment system.

In addition, such files, for example, may simply comprise only a specific Internet address which has previously been called up using the mobile terminal and then transmitted to the infotainment system by means of the swipe gesture, so that the same Internet address can be recalled on-board by means of a suitable browser of the infotainment system.

The corresponding data sets are application-specific both with reference to the mobile terminal as well as with respect to the infotainment system of the motor vehicle. If, for example, a route is preconfigured by means of a navigation app of the mobile terminal, wherein the corresponding data record is subsequently transmitted to the infotainment system, the infotainment system is designed to recognize that this is a navigation data set so that the infotainment system processes the received navigation data set in such a way that the navigation data set is processed and used by means of a navigation device of the infotainment system. The same applies to further various applications of the mobile terminal and the infotainment system.

A detection of a predetermined confirmation action on-board is understood to mean that the corresponding confirmation action is detected by means of an on-board detection device. For this purpose, various sensor devices can be used on-board. Preferably, the data sets are deleted from the buffer memory as soon as they have been transmitted to the further memory, so that the buffer memory is not unnecessarily loaded with data.

Overall, the solution according to the invention thus makes possible a controlled use of the data sets transmitted by the mobile terminal, as a result of which, in particular, a driver of the corresponding motor vehicle is not overly distracted by a flood of data.

In an advantageous embodiment of the invention, it is provided that the at least one mobile terminal is automatically connected wirelessly to the infotainment system as soon as the mobile terminal is within a predetermined range, in particular within the motor vehicle, and a transmission of data sets from the mobile terminal to the buffer memory is automatically made possible. In other words, manual coupling of the mobile terminal to the infotainment system is no longer required. A data transfer into the buffer memory when the swipe gestures is detected is thus also possible directly and automatically. In particular, it is no longer required for the mobile terminal to be coupled to the infotainment system, for example, if this is a smartphone, including all contacts, music tracks and the like. As a result, several occupants can also transmit information in the form of the data sets to the infotainment system without first having to link their respective mobile terminals to the infotainment system of the motor vehicle.

A further advantageous embodiment of the invention provides, that a predetermined gesture, a predetermined voice command and/or actuation of at least one predetermined control element on-board is provided as the confirmation action. In other words, a plurality of confirmation actions are predetermined, by means of which the data sets stored in the buffer memory can be transmitted to the further memory so that the infotainment system can process them accordingly. Preferably, it is also possible that the data transmitted to the buffer memory can be rejected. For example, the data stored in the buffer memory are deleted as soon as a predetermined refusal action has been detected on-board, which can also be effected, for example, in the form of a correspondingly predetermined gesture, a predetermined voice command and/or an actuation of at least one predetermined on-board control element.

According to a further advantageous embodiment of the invention, it is provided that a specific display device of the infotainment system is selected as a function of a determined movement direction, and the data sets are displayed by means of this display device. Displaying the data sets is to be understood that by means of a respectively matching use or application of the infotainment system using the data sets, the generated display is displayed on the relevant display device. For example, it can be provided that the data sets are displayed in a combination instrument of the motor vehicle if it has been detected that a driver has carried out a leftward directed swipe gesture in the vehicle interior and the data are displayed in a central display or a passenger display of the motor vehicle if it has been detected that the driver has carried out a rightward directed swipe gesture in the vehicle interior. This above-mentioned example relates to a left-hand-drive vehicle, in the case of a right-hand drive vehicle, it is correspondingly reversed. Through the direction of movement of his gesture within the vehicle interior, a driver can thus easily control on which display device of the motor vehicle the transmitted data sets are to be displayed. Correspondingly, it is also possible that, for example, a passenger can execute the gesture to the left or right, so as to control on which of the display devices of the motor vehicle the transmitted data sets are to be displayed. This makes it possible, in a particularly simple and comfortable manner, to control on which of the display devices of a motor vehicle the transmitted data sets are to be displayed. In other words, it is possible to determine by corresponding gestures on which display device an application of the infotainment system corresponding to the data set loaded in the further memory is to be displayed.

A further advantageous embodiment of the invention provides that data sets, which relate to predefined applications of the infotainment system, are transmitted to the further memory exclusively and then processed by means of the infotainment system if it has been detected that a driver of the motor vehicle has performed the confirmation action. For example, certain applications or applications of the infotainment system can be predetermined or predefined in which the transmission of the data set into the further memory and the subsequent processing by the infotainment system takes place only as soon as it has been detected that a driver of the motor vehicle has carried out the confirmation action. Preferably, the infotainment system is freely configurable in this respect, so that it is possible to specify which types of data sets are to be utilized by the infotainment system only in the case of a confirmation action being carried out by the driver. As a result, distractions of the driver during the driving of the motor vehicle can be considerably reduced. For example, a camera system may be arranged in the vehicle interior, which is designed to detect whether the driver or another vehicle occupant has carried out the corresponding predetermined confirmation action or confirmation actions. If a predetermined control element is, for example, a steering wheel button, it can also automatically be assumed that the driver has performed the confirmation action.

According to a further advantageous embodiment of the invention, it is provided that at least one data set stored on at least one further mobile terminal is transmitted wirelessly to the infotainment system as soon as a swipe gesture performed on the further mobile terminal has been detected. Preferably, it is possible that a plurality of vehicle occupants each executing the swipe gesture on their mobile terminals can effect a wireless transmission of their respective data sets stored on the mobile terminals to the infotainment system. Preferably, the corresponding data sets are transmitted chronologically to the infotainment system and are stored in the buffer memory, wherein the data sets are also transmitted to the further memory and are utilized by the infotainment system only when the predetermined confirmation action has been detected. Thus, a plurality of vehicle occupants can also transmit respective data sets from their mobile terminals to the infotainment system of the motor vehicle in a particularly simple and convenient manner.

A further advantageous embodiment of the invention provides that the data sets transmitted to the buffer memory are grouped chronologically sorted according to their input into the buffer memory and/or according to respective applications of the infotainment system, in particular in the form of a list, wherein the respectively detected confirmation actions are always only referred to previously selected data sets. Vehicle occupants can thus recognize in a particularly simple manner how many and which data sets have just been transmitted to the buffer memory and can be utilized by the infotainment system as a function of corresponding confirmation action.

In a further advantageous embodiment of the invention, it is provided that data sets transmitted to the buffer memory are automatically deleted as soon as all vehicle occupants have left the motor vehicle and a predetermined time has elapsed. This is particularly advantageous when the motor vehicle is used for car-sharing applications, since it is usually possible to conclude after leaving the vehicle and after a predetermined time that a particular booking of the motor vehicle has been terminated and thus, during a subsequent booking, other vehicle occupants will use the motor vehicle. In this context, it is also possible for the buffer memory to be deleted only as soon as, for example, a telematics system has detected that a relevant booking of the motor vehicle has been terminated. In a conventional, in particular private, use of the motor vehicle, it is of advantage if the data sets transmitted to the buffer memory are automatically deleted as soon as all vehicle occupants have left the motor vehicle and a predetermined time has elapsed. For example, the duration can be predetermined by a few hours or be freely adjustable via a corresponding interface of the infotainment system. This counteracts an unwanted flooding of information of vehicle occupants, in particular of the driver, since the buffer memory is emptied at regular intervals.

According to a further advantageous embodiment of the invention, it is provided that the data sets transmitted to the buffer memory are displayed by means of a display device of the motor vehicle as long as data sets are still located in the buffer memory. For example, the display takes place on a central display of the motor vehicle, which is operated in a split-screen mode, as long as data sets are located in the buffer memory. Alternatively, it can also be provided that a status light is displayed, by means of which it is signaled that there are still data sets in the buffer memory in order to inform the vehicle occupants of this condition. Alternatively or additionally, it may also be provided that the number of data sets stored in the buffer memory is displayed. With all these measures, it is achieved that the vehicle occupants are always informed that data sets are currently located in the buffer memory, which can be processed by the infotainment system if a corresponding confirmation action is present.

The infotainment system according to the invention for a motor vehicle is designed to receive at least one wirelessly transmitted data set stored on at least one mobile terminal as soon as a swipe gesture carried out on the mobile terminal has been detected. The infotainment system according to the invention is characterized in that the infotainment system is designed to store the at least one data set firstly in a buffer memory of the infotainment system and to transmit it exclusively to a further memory of the infotainment system and subsequently to process said data set when a predetermined confirmation action has been detected on-board. Advantageous embodiments of the method according to the invention are to be regarded as advantageous embodiments of the infotainment system according to the invention, wherein the infotainment system comprises in particular means for performing the method steps.

Further advantages, features, and details of the invention arise from the following description of advantageous exemplary embodiments, as well as with reference to the drawing. The features and feature combinations mentioned above in the description, as well as the features and feature combinations mentioned below in the FIGURE description and/or shown only in the single FIGURE, can be used not only in the specified combination but also in other combinations or alone without leaving the scope of the invention.

In the sole FIGURE, the drawing shows a schematic representation of a motor vehicle which comprises an infotainment system which is designed to wirelessly receive and process data sets stored on different mobile terminals.

A motor vehicle 10 comprises an infotainment system 12, which is designed to receive respective data set 16 stored on respective mobile terminal 14 wirelessly as soon as a swipe gesture carried out on the mobile terminal 14 has been detected.

The infotainment system 12 also comprises a buffer memory 18, a further memory 20, a combination instrument 22, a central display 24 and a passenger display 26.

The infotainment system 12 is designed to initially store the data sets 16 in the buffer memory 18 and to transmit them exclusively to the further memory 20 as well as to process said data sets when a predetermined confirmation action has been detected on-board. A method for operating the infotainment system 12 is explained in more detail below.

A plurality of vehicle occupants, namely a driver 28, a passenger 30 and additional vehicle occupants 32 are schematically indicated, who are located in the vehicle interior of the motor vehicle 10. The mobile terminals 14, which may be, for example, smartphones or tablet computers with touch-sensitive displays, are automatically connected wirelessly to the infotainment system 12 as soon as the mobile terminals 14 are located within the motor vehicle 10, as shown herein wherein a transmission of the corresponding data sets 16 from the mobile terminals 14 to the buffer memory 18 is automatically made possible. Thus, no manual coupling of the mobile terminals 14 is required any more as soon as the mobile terminals 14 are arranged within the motor vehicle 10. In addition, a data transmission into the buffer memory 18 is also automatically made possible in the case of a detected swipe gesture.

For example, the passenger 30 has just opened a music application on his mobile terminal 14, in which various music files are displayed to him. As soon as the passenger 30 carries out a swipe gesture on his mobile terminal 14, that is, for example, swiping with a finger over the display of the mobile terminal, the music files previously selected by him are transmitted wirelessly in the form of one or a plurality of data sets 16 to the infotainment system 12 and are firstly stored in the buffer memory 18 of the infotainment system 12. In the same way, by the corresponding execution of swipe gestures on their mobile terminal 14, the further vehicle occupants 32 can also transmit their preferred and selected music files in the form of respective data sets 16 to the infotainment system 12, which are likewise stored in the buffer memory 18.

As soon as a predetermined confirmation action from one of the vehicle occupants 28, 30, 32 has been detected on-board, the data sets 16 stored in the buffer memory are transmitted to the further memory 20 of the infotainment system 12 and subsequently processed by means of the infotainment system 12. A processing by the infotainment system 12 in this example can mean that the data sets 16 relating to the music files are compiled in the form of a playlist by means of a corresponding application of the infotainment system 12 and then played back. It is thus possible in a simple manner for different vehicle occupants 30, 32 to transmit the data sets 16 relating to the music files to the infotainment system 12 by corresponding swipe gestures on their mobile terminals 14, wherein these transmitted data sets 16 area only utilized by the infotainment system 12 when a predetermined confirmation action from one of the vehicle occupants 28, 30, 32 has been detected.

For example, a predetermined gesture, a predetermined voice command and/or actuation of at least one predetermined control element on-board is provided as the confirmation action. For example, the infotainment system 12 can be configured with respect to the music files 16 in such a way that the data sets 16 stored in the buffer memory 18 are always stored in the further memory 20 and processed by the infotainment system 12 as soon as one of the vehicle occupants 28, 30, 32 has performed the predefined confirmation action and said predefined confirmation action has been detected on-board.

Alternatively, the infotainment system 12 can be also configured such that the data sets 16 are transmitted to the further memory 20 exclusively and then processed by means of the infotainment system 12 if it has been detected that the driver (28 of the motor vehicle 28 has performed the corresponding confirmation action. In this case, therefore, only the driver 28 can effect that the data sets 16, which are transmitted to the infotainment system 12 and which relate to the music files, to be actually used and, in particular, also to be played back. For example, a camera system, which is not shown here, can be arranged in the vehicle interior, which is designed to detect who of the vehicle occupants 28, 30, 32 has performed correspondingly predetermined confirmation actions to activate—as a function thereof—only a use of the data files 16 concerning the music files by the infotainment system 12 when it has been detected that the driver 28 has also carried out the corresponding confirmation action.

Preferably, the infotainment system 12 is designed in such a way that it is possible to freely configure which types of data sets can be activated for which applications of the infotainment system 12 only by the driver 28 or by the further vehicle occupants 30, 32.

Preferably, the data sets 16 transmitted to the buffer memory 18, in the present example the data sets 16 relating to the music files, are sorted chronologically by their input into the buffer memory 18 and—if they were different types of data sets for different applications of the infotainment system 12—also to group according to respective applications of the infotainment system, for example, by displaying them in the form of a list, wherein correspondingly detected confirmation actions are always referred to only previously selected data sets 16. For example, the data sets 16 transmitted to the buffer memory 18 are displayed by means of the central display 24 as long as the data sets 16 are still located in the buffer memory. For example, the central display unit 24 can be operated in a split-screen mode, as long as the data sets 16 are still located in the buffer memory 18. As a result, it is in particular obvious to the driver 28 and the passenger 30 that just a plurality of data sets 16 relating to the music files have been loaded into the buffer memory 18 and only one of the predetermined confirmation actions has to be performed so that these music files will be transmitted to the further memory 20 and will be used by the infotainment system 12.

Preferably, the data sets transmitted to the buffer memory 18, which have not been transmitted to the further memory 20, are automatically deleted as soon as all the vehicle occupants 28, 30, 32 have left the motor vehicle 10 and a predetermined time has elapsed. If the motor vehicle 10 is used, for example, for a car sharing, it is also possible for the data sets remaining in the buffer memory 18 to be automatically deleted when a booking of the motor vehicle 10 has been terminated. If, on the other hand, the motor vehicle 10 is used privately, the data sets 16 loaded into the buffer memory 18 are automatically deleted after leaving the motor vehicle 10 and after a predetermined time, for example after three hours. In the case of the use of the motor vehicle 10 for a car sharing, this has the advantage that different users of the motor vehicle 10 no longer recall from the buffer memory 18 the data sets 16 of a vehicle occupant previously using the motor vehicle 10. In the case of a private use of the motor vehicle 10, a corresponding deletion of the buffer memory 18 has the advantage that vehicle occupants and, in particular, the driver of the motor vehicle 10 are not flooded with data sets 16 still remaining in the buffer memory 18.

In the example explained above, the data sets 16, which are transmitted from the mobile terminals 14 to the infotainment system 12, are music files. In principle, various data sets 16, such as navigation files, contact data for an address book and the like, can be transmitted to the infotainment system 12 in the same way from the mobile terminals 14 when a swipe gesture is carried out on the mobile terminals 14.

For example, it is possible for the driver 28 to have already started off with the motor vehicle 10, wherein said driver requests the passenger 30 to configure a particular route with a plurality of intermediate destinations by means of a corresponding application installed on the mobile terminal 14. As soon as the passenger 30 has preconfigured the route with the intermediate destinations by means of his mobile terminal 14, said passenger in turn carries out a swipe gesture on the mobile terminal 14, whereby a navigation file describing the preconfigured route in the form of a corresponding data set 16 is again transmitted wirelessly to the infotainment system 12 and firstly stored in the buffer memory 18 of the infotainment system 12.

The passenger 30 informs the driver 28 that the preconfigured route now has been transmitted to the infotainment system 12, which is, for example, indicated by the above-mentioned split-screen mode by means of the central display 24. The data set 16 which relates to the corresponding navigation file is then displayed in the combination instrument 22 of the motor vehicle 10 when it has been detected that the driver 28 has executed a leftward-facing gesture in the vehicle interior, wherein the data set 16, for example, is displayed on the central display 24 or the passenger display 26 when it has been detected that the driver 28 has executed a rightward-facing gesture in the vehicle interior. A display of the data set 16 is understood to mean that a suitable application of the infotainment system 12 is selected, which uses the data set 16 and the corresponding information is displayed.

In general, the infotainment system 12 is designed in such a way that, as a function of a determined direction of movement of the gesture detected as the confirmation action a specific display device is selected, in the present case the combination instrument 22, the central display 24 or the passenger display 26, and an application—in this case a navigation device—using the data set 16 relating to the navigation file, and the corresponding information is displayed by means of one of the display devices 22, 24, 26.

In the example of the navigation file, a display of the navigation file means that the infotainment system 12 first transmits the received navigation file again from the buffer memory 18 to the further memory 20 after the detection of the confirmation action by the driver 28, wherein a navigation device of the infotainment system 12 correspondingly processes the navigation file comprising the preconfigured route and displays on one of the display devices 22, 24, 26.

If, in the example of the navigation file, the driver 28, for example, had changed his mind and did not want to use the preconfigured route in the form of the navigation file, the infotainment system 12 can also be designed in such a way that in the case of a detection on-board of a predetermined refusal gesture, for example, by the driver 28, the data set 16 which is transmitted to the buffer memory 18 and which relates to the navigation file is deleted again. For all possible other types of data sets, it is also possible that a data set 16 previously transmitted to the buffer memory 18 can be deleted from the buffer memory 18 by a predetermined refusal action, whether by the driver 28 or, depending on the configuration of the infotainment system 12, by the further vehicle occupants 30, 32.

By means of the infotainment system 12 explained and the corresponding method for operating the infotainment system 12, it is thus possible in a particularly simple manner for different vehicle occupants 28, 30, 32 to transmit data sets 16 stored on respective mobile terminals 14 to the infotainment system 12, wherein said data sets 16 can be used by the infotainment system 12.

The invention claimed is:

1. A method for operating an infotainment system of a motor vehicle in which a data set stored on a mobile terminal is transmitted wirelessly to the infotainment system and received by the infotainment system when a swipe gesture has been detected on the mobile terminal, the method comprising:
    storing the data set in a buffer memory of the infotainment system;
    based on detecting a predetermined confirmation action on-board, transmitting the data set from the buffer memory to a further memory of the infotainment system and processing the data set using the infotainment system;
    selecting a display device of the infotainment system in response to a determined direction of movement of a gesture detected as the predetermined confirmation action; and
    displaying the data set using the display device,
    wherein data sets in the buffer memory are deleted automatically when all vehicle occupants have left the motor vehicle and a predetermined time has elapsed.

2. The method according to claim 1, wherein the mobile terminal is automatically connected wirelessly to the infotainment system when the mobile terminal is within a predetermined range of the motor vehicle.

3. The method according to claim 1, wherein the predetermined confirmation action is at least one of a predetermined voice command or actuation of at least one predetermined control element on-board.

4. The method according to claim 1, further comprising:
    based on detecting that a driver of the motor vehicle has performed the predetermined confirmation action, transmitting the data sets, which relate to predefined applications of the infotainment system, to the further memory and processing the data sets using the infotainment system.

5. The method according to claim 1, further comprising:
    wirelessly transmitting a data set stored on a further mobile terminal to the infotainment system when a swipe gesture performed on the further mobile terminal has been detected.

6. The method according to claim 1, wherein:
    the data sets in the buffer memory are grouped chronologically according, to their input into the buffer memory and/or according to respective applications of the infotainment system, and
    the predetermined confirmation action refers to selected data sets from the data sets.

7. The method according to claim 1, wherein the data sets in the buffer memory are displayed by the display device as long as the data sets are in the buffer memory.

8. An infotainment system for a motor vehicle that is configured to receive a data set, stored on a mobile terminal, that is wirelessly transmitted from the mobile terminal when a swipe gesture carried out on the mobile terminal has been detected, the infotainment system comprising:
    a buffer memory configured to store the data set;
    a further memory configured to store the data set transmitted from the buffer memory based on a predetermined confirmation action being detected on-board; and
    a display device configured to display the data set, the display device being selected to display the data set in response to a determined direction of movement of a gesture detected as the predetermined confirmation action,
    wherein data sets in the buffer memory are deleted automatically when all vehicle occupants have left the motor vehicle and a predetermined time has elapsed.

9. The infotainment system according to claim 8, wherein the mobile terminal is automatically connected wirelessly to the infotainment system when the mobile terminal is within a predetermined range of the motor vehicle.

10. The infotainment system according to claim 8, wherein the predetermined confirmation action is at least one of a predetermined voice command or actuation of at least one predetermined control element on-board.

11. The infotainment system according to claim 8, wherein:
    the data sets in the buffer memory are grouped chronologically according to their input into the buffer memory and/or according to respective applications of the infotainment system, and
    the predetermined confirmation action refers to selected data sets from the data sets.

12. The infotainment system according to claim 8, wherein the data sets in the buffer memory are displayed by the display device as long as the data sets are in the buffer memory.

* * * * *